July 28, 1936. H. E. HEIGIS Re. 20,047

RELEASE DEVICE FOR INFLATABLE FLOTATION DEVICES

Original Filed June 28, 1933

INVENTOR
HENRY ERNEST HEIGIS
BY J. William Carson
ATTORNEY

Reissued July 28, 1936 Re. 20,047

UNITED STATES PATENT OFFICE 20,047

RELEASE DEVICE FOR INFLATABLE FLOTATION DEVICES

Henry Ernest Heigis, West Orange, N. J., assignor to Walter Kidde & Company, Inc., Bloomfield, N. J., a corporation of New York Original No. 2,036,695, dated April 7, 1936, Serial No. 678,004, June 28, 1933. Application for reissue May 28, 1936, Serial No. 82,379

8 Claims. (Cl. 221—73.5)

This invention relates generally to inflatable life-preservers of the type employing a cartridge containing highly compressed gas, such as carbon dioxide, as the inflating medium, the life-preserver consisting essentially of a chambered vest or the like, a compressed gas cartridge, and novel means for holding the cartridge and for effecting the discharge of the compressed gas from the cartridge into the chamber of the vest.

Among the more general objects of the invention is the provision of a life-preserver of the type referred to which is of simple and durable construction, simple and efficient in operation, and economical to manufacture.

Among the more specific objects of the invention is the provision of a life-preserver of the type referred to in which the compressed gas cartridge is easily replaced, in which it is impossible to incorrectly replace the cartridge, in which leakage of the gas from the life-preserver is effectively prevented, and in which the means for effecting the discharge of the contents of the cartridge is operable from any one of a plurality of directions.

These, and other objects of the invention, not specifically enumerated above, will be apparent as the invention is described in greater detail in connection with the accompanying drawing, wherein:

Figure 1 shows an inflatable life-vest 1 of rubberized fabric with a compressed gas cartridge assembled thereto and complete and ready for use. The vest itself is of standard construction and presents no features to be claimed herein.

Figure 1:
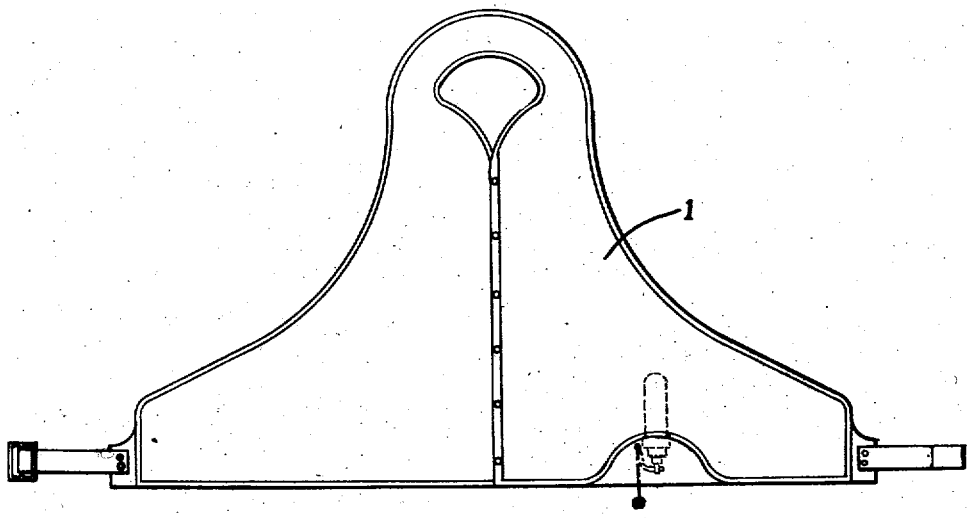
Figure 1 is a view in elevation of a life-vest embodying the improved compressed gas cartridge holding and discharge effecting means of the present invention.
Figure 2:
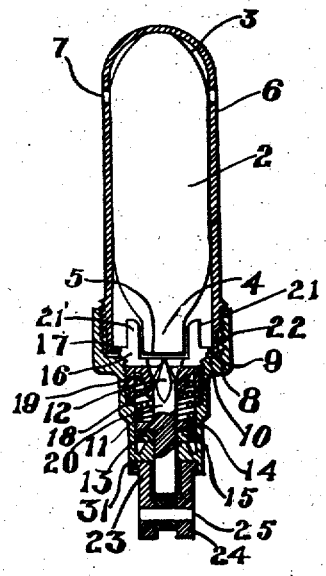
Figure 2 is an enlarged sectional view, showing the features of construction of the cartridge holding means and cartridge discharge effecting means.

Referring now to Figure 2, the reference numeral 2 represents a commercially procurable compressed gas cartridge having a rounded end 3 and an end 4 formed with a neck and having a punturable end wall 5.

Figure 3:
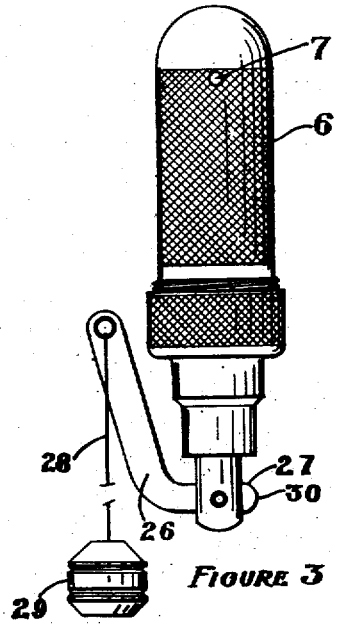
Figure 3 is a view in elevation corresponding to the showing of Figure 2.

In accordance with the present invention there is provided a holder or container 6 adapted to receive the cartridge 2 in the position shown, and preferably knurled circumferentially over a portion of its length, as shown in Figure 3, for enabling a durable and air-tight joint to be made with the wall of the vest at the point where the container 6 is inserted through the wall of the vest. The exact manner in which the container 6 is inserted into and secured to the wall of the vest need not be here described, as it forms no part of the present invention, being now a standard practice in this art. It should, however, be noted that the container 6 is provided with openings 7 for communicating with the inflatable chamber of the vest, and it will accordingly be understood that the container 6 must be assembled into the vest in a manner to leave the openings 7 uncovered by the wall of the vest.

Coupled to the container 6, by means of a screw-threaded engagement, and serving as a closure for the open end of the container, is a chambered body member 8. In order to provide a gas-tight relationship between the container 6 and the body member 8, there is provided a gasket 9 which is compressed between a shoulder 10 of the member 8 and the end of the container 6. Mounted within the chamber of the body member 8 is a spindle 11, carrying a pointed puncturing element 12 positioned adjacent but spaced from the puncturable wall 5 of the carbridge 2, the spindle 11 extending exteriorly of the member 8 for a purpose to be described. Encompassing the opening in the wall of the member 8, through which the spindle 11 extends exteriorly of the member 8, is a valve seat 13, which is adapted to cooperate with a valve comprising a flanged member 14 formed on the spindle 11 and carrying a valve seating material 15.

Assembled within one end of the chamber of the member 8, by means of a screw-threaded engagement, is a bushing 16 provided with a flange 17 for securing the gasket 9 against the shoulder 10 of the member 8, so that the gasket 9 is always available for effecting a gas-tight joint between the member 8 and the container 6. The bushing 16 is also provided with a central bore 18 serving as a guide for the spindle 11, and is recessed, as at 19, for receiving a coiled spring 20, which is designed to bear against the flanged member 14, serving both to normally maintain the puncturing element 12 out of contact with the puncturable wall 5 of the cartridge 2 and to normally maintain a gas-tight relationship between the valve seat 13 and the valve seating material 15. The bushing 16 is also provided with a projecting sleeve portion 21 following closely the contour of the necked end 4 of the cartridge 2 and serving to prevent coupling of the member 8 to the container 6 in the event that the cartridge 2 is incorrectly inserted in the container 6 with the rounded end 3 of the cartridge adjacent the open end of the container 6 instead of adjacent the closed end thereof. The bushing 16 is shown with a diametrically disposed slot 21' for receiving a tool to assemble it to the member 8 and serving also as a passage for the contents discharged from the cartridge.

As an additional safeguard against coupling of the member 8 to the container 6 when the cartridge 2 is incorrectly inserted in the container, the screw-threads normally formed on the container 6 are removed, as shown at 22, for a sufficient distance to prevent engagement of the screw-threads on the container 6 with the screw-threads on the member 8 when the cartridge 2 is in the wrong position.

Mounted upon the exterior of the body member 8 is a sleeve member 23 provided with lugs 24 carrying a pin 25, on which is pivotally mounted a lever 26 having any suitable cam-like surface 27 for engaging the outer end of the spindle 11, upon rotation of the lever 26, for forcing the puncturing element 12 through the frangible wall of the cartridge, so as to release the contents thereof into the container 6 for introduction into the chamber of the vest through the openings 7, in which connection it is to be understood that the cartridge 2 does not fit tightly within the container 6, but that there is sufficient space between them for permitting the contents of the cartridge to reach the openings 7. By designing the lever 26 of the shape shown and by providing an operating cord 28 and an operating handle 29 for operating the lever by pulling the operating handle in a direction substantially parallel to the longitudinal axis of the container 6, the cam-like surface 27 will override its highest point 30, thus permitting the puncturing element 12 to be withdrawn from the opening made in the puncturable wall of the cartridge, under the influence of the coiled spring 20, the latter at the same time effecting a gas-tight relationship between the valve seat 13 and the valve seating material 15, thus preventing escape of the contents of the cartridge past the spindle 11.

In order to prevent leakage of the contents of the cartridge past the spindle during the relatively short period when the valve is unseated, a close-working fit is provided between the spindle 11 and the wall of the member 8 at the point where the spindle passes through the wall.

In order to permit the lever 26 to be operated from any one of a plurality of circumferential positions, the sleeve member 23 is mounted on the member 8 in such a manner as to be freely rotatable thereon, the desired freedom of rotation being accomplished in the construction shown by receiving the flange 31 of the sleeve member 23 within a bored out portion of the member 8 and turning over a portion of the metal of the member 8 to hold the flange 31 against longitudinal movement, while at the same time permitting it to rotate freely.

From the foregoing description it will be seen that I have provided a new and useful structure adapted primarily for use with inflatable life-preservers and carrying out the objects set forth at the beginning. However, while the invention has been described with reference to one specific form of construction, it will be readily understood that the invention is capable of embodiment in other forms of construction for the same or different uses, and I accordingly do not wish my invention to be limited save as defined in the appended claims.

I claim:

1. A compressed gas cartridge unit for a removable metallic compressed gas cartridge of the type having a puncturable metallic wall, comprising a container for the cartridge closed at one end and open at the other end and having a passage in the wall of the container establishing communication with the exterior thereof and arranged to receive the removable compressed gas cartridge with its puncturable wall positioned adjacent the open end of the container, a chambered body member engaging the open end of the container and constituting a closure therefor, the puncturable wall of the compressed gas cartridge being arranged on a necked-in portion of the cartridge, means to prevent assembly of the chambered body member and the container when the cartridge is incorrectly arranged with the puncturable wall thereof opposite to the open end of the container, said last named means comprising a restricted portion of the chamber of the body member adapted to closely encompass the necked-in portion of the cartridge and to prevent the aforesaid assembly when the cartridge is reversely positioned, and a movable puncturing member mounted in the chamber of the body member and adapted to puncture the puncturable wall of the compressed gas cartridge.

2. A compressed gas cartridge unit for a removable metallic compressed gas cartridge of the type having a puncturable metallic wall, comprising a container for the cartridge closed at one end and open at the other end and having a passage in the wall of the container establishing communication with the exterior thereof and arranged to receive the removable compressed gas cartridge with its puncturable wall positioned adjacent the open end of the container, a chambered body member for closing the open end of the container, means for coupling the chambered body member to the container, the puncturable wall of the compressed gas cartridge being arranged on a necked-in portion of the cartridge, means to prevent initial engagement of the means to couple the chambered body member to the container when the cartridge is incorrectly arranged with the puncturable wall thereof opposite to the open end of the container; and a movable puncturing member mounted in the chamber of the body member and adapted to puncture the puncturable wall of the compressed gas cartridge.

3. A compressed gas cartridge unit for a removable metallic compressed gas cartridge of the type having a puncturable metallic wall, comprising a container for the cartridge closed at one end and open at the other end and having a passage in the wall of the container establishing communication with the exterior thereof and arranged to receive the removable compressed gas cartridge with its puncturable wall positioned adjacent the open end of the container, a chambered body member for closing the open end of the container, means for coupling the chambered body member to the container, the puncturable wall of the compressed gas cartridge being arranged on a necked-in portion of the cartridge, a sleeve on said chambered body member adapted to closely encompass the necked-in portion of the cartridge, when the latter is correctly positioned in the container, said sleeve serving to engage the end of the cartridge when the latter is incorrectly positioned in the container and to so space the chambered body member and the container as to prevent initial engagement of the means to couple the chambered body member to the container, and a movable puncturing member mounted in a chamber of the body member and adapted to puncture the puncturable wall of the compressed gas cartridge.

4. A compresesd gas cartridge unit for a removable metallic compressed gas cartridge of the type having a puncturable metallic wall, comprising a container for the cartridge closed at one end and open at the other end and having a passage in the wall of the container establishing communication with the exterior thereof and arranged to receive the removable compressed gas cartridge with its puncturable wall positioned adjacent the open end of the container, a chambered body member for closing the open end of the container, means for coupling the chambered body member to the container, the puncturable wall of the compressed gas cartridge being arranged on a necked-in portion of the cartridge, a sleeve on said chambered body member adapted to closely encompass the necked-in portion of the cartridge when the latter is correctly positioned in the container, said coupling means being proportioned to prevent initial engagement thereof when the cartridge is incorrectly positioned in the container and the sleeve engages the end thereof, and a movable puncturing member mounted in the chamber of the body member and adapted to puncture the puncturable wall of the compressed gas cartridge.

5. A compressed gas cartridge unit for a removable metallic compressed gas cartridge of the type having a puncturable metallic wall arranged on a necked-in portion of the cartridge, comprising a container for the cartridge formed of at least two parts and having a passage in a wall of at least one of the parts establishing communication with the exterior of the container, means to couple and uncouple the parts of said container at will, whereby said parts may be uncoupled to enable the removable compressed gas cartridge to be inserted in the container, a movable puncturing member mounted in one part of the container and adapted to puncture the puncturable wall of the compressed gas cartridge when the latter is correctly arranged in the container with its puncturable wall directed toward the movable puncturing member, and means to prevent assembly of the parts of the container when the cartridge is incorrectly arranged in the container with the puncturable wall thereof directed away from the movable puncturing member, said last named means comprising a restricted portion of the part of the container mounting the movable puncturing member adapted to closely encompass the necked-in portion of the cartridge and to prevent the aforesaid assembly when the cartridge is reversely positioned.

6. A compressed gas cartridge unit for a removable metallic compressed gas cartridge of the type having a puncturable metallic wall arranged on a necked-in portion of the cartridge, comprising a container for the cartridge formed of at least two parts and having a passage in a wall of at least one of the parts establishing communication with the exterior of the container, means to couple and uncouple the parts of said container at will, whereby said parts may be uncoupled to enable the removable compressed gas cartridge to be inserted in the container, a movable puncturing member mounted in one part of the container and adapted to puncture the puncturable wall of the compressed gas cartridge when the latter is correctly arranged in the container with its puncturable wall directed toward the movable puncturing member, and means to prevent initial engagement of the means to couple the parts of the container when the cartridge is incorrectly arranged in the container with the puncturable wall thereof directed away from the movable puncturing member, said last named means comprising a restricted portion of the part of the container mounting the movable puncturing member adapted to cooperate with the cartridge to prevent coupling of said parts when the cartridge is reversely positioned in the container.

7. A compressed gas cartridge unit for a removable metallic compressed gas cartridge of the type having a puncturable metallic wall arranged on a necked-in portion of the cartridge, comprising a container for the cartridge formed of at least two parts and having a passage in a wall of at least one of the parts establishing communication with the exterior of the container, means to couple and uncouple the parts of said container at will, whereby said parts may be uncoupled to enable the removable compressed gas cartridge to be inserted in the container, a movable puncturing member mounted in one part of the container and adapted to puncture the puncturable wall of the compressed gas cartridge when the latter is correctly arranged in the container with its puncturable wall directed toward the movable puncturing member, and a sleeve on the part of the container mounting the movable puncturing member adapted to cooperate with the cartridge when the latter is incorrectly positioned in the container and to so space the parts of the container as to prevent initial engagement of the means to couple the parts of the container.

8. A compressed gas cartridge unit for a removable metallic compressed gas cartridge of the type having a puncturable metallic wall arranged on a necked-in portion of the cartridge, comprising a container for the cartridge formed of at least two parts and having a passage in a wall of at least one of the parts establishing communication with the exterior of the container, means to couple and uncouple the parts of said container at will, whereby said parts may be uncoupled to enable the removable compressed gas cartridge to be inserted in the container, a movable puncturing member mounted in one part of the container and adapted to puncture the puncturable wall of the compressed gas cartridge when the latter is correctly arranged in the container with its puncturable wall directed toward the movable puncturing member, and a sleeve on the part of the container mounting the movable puncturing member adapted to cooperate with the cartridge when the latter is incorrectly positioned in the container, said coupling means being proportioned to prevent initial engagement thereof when the cartridge is incorrectly positioned in the container and the sleeve cooperates with the end thereof opposite to the end having the puncturable wall.

HENRY ERNEST HEIGIS.